United States Patent
Chen

(10) Patent No.: US 8,181,213 B2
(45) Date of Patent: May 15, 2012

(54) IP-BASED HOMETOWN TV PROGRAM DELIVERY SYSTEM

(75) Inventor: Cheng-sean Chen, Taipei (TW)

(73) Assignee: AverMedia Technologies, Inc., New Taipei (TW)

( * ) Notice: Subject to any disclaimer, the term of this patent is extended or adjusted under 35 U.S.C. 154(b) by 932 days.

(21) Appl. No.: 11/882,212

(22) Filed: Jul. 31, 2007

(65) Prior Publication Data

US 2008/0163324 A1    Jul. 3, 2008

Related U.S. Application Data

(63) Continuation-in-part of application No. 11/797,873, filed on May 8, 2007, and a continuation-in-part of application No. 11/645,755, filed on Dec. 27, 2006.

(60) Provisional application No. 60/877,690, filed on Dec. 29, 2006.

(51) Int. Cl.
*H04N 7/173* (2011.01)
*G06F 15/173* (2006.01)
*G06F 7/00* (2006.01)
*G06F 17/00* (2006.01)

(52) U.S. Cl. .......... 725/114; 725/98; 725/109; 725/110; 707/622; 709/238

(58) Field of Classification Search .................. None
See application file for complete search history.

(56) References Cited

U.S. PATENT DOCUMENTS

| | | | |
|---|---|---|---|
| 5,027,400 A | 6/1991 | Baji et al. | |
| 6,973,667 B2 | 12/2005 | Fritsch | |
| 7,584,289 B2 * | 9/2009 | Pharn | 709/230 |
| 2002/0124258 A1 * | 9/2002 | Fritsch | 725/88 |
| 2003/0097661 A1 | 5/2003 | Li et al. | |
| 2003/0177186 A1 * | 9/2003 | Goodman et al. | 709/205 |
| 2006/0277316 A1 * | 12/2006 | Wang et al. | 709/231 |
| 2007/0140300 A1 * | 6/2007 | Handekyn et al. | 370/486 |
| 2008/0196056 A1 * | 8/2008 | Bassett et al. | 725/25 |

* cited by examiner

*Primary Examiner* — Mark D Featherstone
(74) *Attorney, Agent, or Firm* — CKC & Partners Co., Ltd.

(57) ABSTRACT

The present invention is to disclose an IP-based hometown TV program delivery system comprising at least one TV program provider for providing a plurality of channels of TV programs; and at least one agency at a server-end for providing a plurality of digital video contents converted from said corresponding TV programs; characterized in that said agency at a server-end distributes said plurality of digital video contents to authorized users at a client-end via a broadcasting network, wherein each authorized users has subscription to said TV programs so as to get permission for watching and receives from said agency said digital video contents converted from said corresponding TV programs via said broadcasting network.

15 Claims, 9 Drawing Sheets

IP-BASED HOMETOWN TV PROGRAM DELIVERY SYSTEM

This application claims the benefit of Provisional Application Ser. No. 60/877,690 entitled "P2P-based broadcast system and method using the same" filed on Dec. 29, 2006, and is a continuation-in-part of application Ser. No. 11/797,873 entitled "P2P-based broadcast system and method using the same" filed on May 8, 2007 and a continuation-in-part of application Ser. No. 11/645,755 entitled "Timezone-shifting IP-based video broadcasting system and method using the same" filed on Dec. 27, 2006 hereof. The disclosure of the Provisional Application is incorporated herein.

BACKGROUND OF THE INVENTION

1. Field of the Invention

The present invention relates to an IP-based network system, and more particularly to an IP-based network for broadcasting TV programs from a server end to client ends.

2. Description of the Related Art

With the advent of networking communications technology, many people's daily lives are closely related to the Internet/Intranet business and are significantly impacted by the Internet/Intranet technology's evolution and revolution. More and more people use the Internet/Intranet and even access/browse the Internet/intranet in their daily lives, whether for work, entertainment, shopping, or education, etc. The Internet/Intranet is creating new economical activities, which are altering people's traditional way of living.

It's known that IP-based TV systems were proposed several years ago. IP-based TV system provide people the possibility of watching TV programs via internet/intranet at a location, such as at home, by using only a regular PC with software installed or a specific device (e.g. set top box). Although people may watch video contents (e.g. television shows or programs), which have been broadcasted over the internet/intranet, however, most IP-based service providers do not guarantee the quality of video contents to users. In addition, most of the local telecom carriers, on-line TV providers, and web-site companies provide the video content in their own mother or familiar languages rather than other foreign languages; for example, all the Asian Americans are difficult to receive the high quality of Asian TV programs which are originally broadcast in Asia.

In current network environments, there is wide interest for users to receive such TV programs as TV programs provided by Internet content providers in a faster way. However, referred to FIG. 1, the conventional client/server network architecture does not fulfill the user's needs due to lack of available bandwidth of the network and heavy workload of the central server. In case of network traffic congestion, when a particular video content is being accessed by many users, it will take much time for downloading the complete video content from the central server.

To sum up, referred to FIG. 1 for illustrating a conventional IP-based TV system. The IP-based TV system 10 includes a TV content broadcasting center 11 is responsible to deliver the TV programs to the client players via the Internet or intranet. It's no doubt that the IP-based TV system 10 serves the customers with English-spoken video contents. If the non-English native customers desire to receive the non-English TV programs from the system, for example, one Chinese user accesses to the client player 13, one Korean user accesses to the client player 14, and one Japanese user accesses to the client player 15, for being desirous of watching their own native TV programs delivered from the TV content broadcasting center 11, the system will get trouble in selection of different language types of TV programs so that the user needs cannot be satisfied.

A prior art of U.S. Pat. No. 5,027,400 has disclosed an approach to providing an image communication/bidirectional broadcast system such as a broadband ISDN or a cable television, and in particular, to an advertisement or commercial base bidirectional broadcast system capable of coping with various needs of subscribers for programs and advertisement. This art does not solve when a user away from home is desirous of watching his/her hometown TV programs during his/her traveling period.

A prior art of U.S. Pat. No. 6,973,667 has disclosed an approach to delivering media program contents to customers through multicast or unicast, and wherein a multicast delivery unit and a unicast delivery unit will deliver the data packets for the media program to customers in multicasting and unicasting fashions, respectively. Moreover, the art is to provide the time-shifting feature such as TV programs recording in the client sides. However, this art does not solve the time zone issues when the customers desire to watch the overseas TV programs in the same broadcast time schedule as it is broadcast in the originating time zone like East Asia regions.

A prior art of US patent No. US20030097661 has disclosed a system for providing IP centric, multi-channel, telecommunication services such as television on demand, video on demand, karaoke on demand, Internet access, and telephone services. However this art merely provide customers with TV programs and customers have no language selections for receiving the TV programs originated by the specific language which is mother tongue to the customers.

In some case, if a user subscribed to the TV program provider would like to watch the same hometown TV programs when he/she is planning to be out of town or travel overseas, it is mostly impossible to watch the same hometown TV programs in this situation. On the other hand, the user may request an agency to deliver his/her hometown TV programs with high quality and resolution for watching during his/her travel period.

SUMMARY OF THE INVENTION

In order to solve the above-mentioned problems, the present invention provides an IP-based hometown TV program delivery system, which comprises at least one TV program provider for providing plural channels of TV programs; and at least one agency at a server-end for providing plural digital video contents converted from said corresponding TV programs; characterized in that said agency at a server-end distributes said plurality of digital video contents to authorized users at a client-end via a broadcasting network, wherein each authorized users has subscription to said TV programs so as to get permission for watching and receives from said agency said digital video contents converted from said corresponding TV programs via said broadcasting network.

A P2P based network based on the IP-based hometown TV program delivery system comprises at least one video head-end server for receiving said plurality of digital video contents converted from said corresponding TV programs, said video head-end server comprising a splitter to split each of said digital video contents into plural video files for each video file being formed of a number of groups of pictures (GOPs), and said video head-end server further comprising at least one content repository for storing said video files corresponding to each of said digital video contents; at least one relay server for receiving said video files from said video head-end server and broadcasting said video files from said one relay server; at least one seed host for receiving said video files from said relay server and broadcasting said video files from said seed host; plural peer hosts accessed by said authorized users for receiving said video files from said seed host and/or other neighboring peer hosts and broadcasting said video files; at least one network management server for managing data and signal communications among said seed host and said peer hosts, said network management server comprising at least one tracker for generating a seed/peer list based on a request for said video files from each of said authorized users; and at least one system management server for validating authentication and authorization of each of said authorized users while receiving an access request from each of said authorized user; wherein each peer comprises a player to process said video files for playback when said video files are received.

A broadcasting network according to the IP-based hometown TV program delivery system comprises a broadcasting apparatus for storing and broadcasting said plurality of digital video contents; and plural players accessed by said authorized users for receiving said plurality of digital video contents from the broadcasting apparatus based on video streaming via the internet; wherein said broadcasting apparatus comprises: a timezone shifting means for shifting the timing lag between the overseas timezone as TV content originating and the local timezone as authorized user watching so as to deliver said corresponding digital video contents to said players in a preferred timing for said authorized user; a timezone non-shifting means for delivering said digital video contents to said player in the quasi-realtime timing as said corresponding TV programs broadcasted at the overseas timing; a language selecting means for, in response to a request for authorized user's preferred language selection from said player, providing said digital video content originated in the specified language to the player; and a user profile means for, whenever each of said players accesses said broadcasting network, collecting and analyzing said authorized user data from said player to develop a user profile for each of said authorized users.

Therefore, the principal object of the present invention is to provide an IP-based hometown TV program delivery system, wherein, at least one agency at a server-end for providing content conversion from hometown TV programs of the content provider into plural digital video contents and delivering the digital video contents to the users subscribed to content provider and authorized by the agency as well, so as to overcome the situation that there is no hometown TV programs for watching during user's travel period.

Another object of the present invention is to provide another IP-based hometown TV program delivery system, wherein, at least one agency at a server-end for providing content conversion from plural hometown TV programs of the content provider into plural digital video contents and delivering the digital video contents to the users authorized by the agency who is subscribed to the content provider, so as to overcome the situation that there is no hometown TV programs for watching during user's travel period.

BRIEF DESCRIPTION OF THE DRAWINGS

FIG. 2b is an illustrative diagram of a P2P based network for a broadcasting network in the first preferred embodiment shown in FIG. 2a.

FIG. 2c is an illustrative diagram of another P2P based network for a broadcasting network in the first preferred embodiment shown in FIG. 2a.

FIG. 2e is an illustrative diagram of another broadcasting network in the first preferred embodiment shown in FIG. 2a.

FIG. 3b is an illustrative diagram of a P2P based network for a broadcasting network in the second preferred embodiment shown in FIG. 3a.

FIG. 3c is an illustrative diagram of another P2P based network for a broadcasting network in the second preferred embodiment shown in FIG. 3a.

DETAILED DESCRIPTION OF THE EMBODIMENTS

The present invention discloses an IP-based hometown TV program delivery system for broadcasting the digital video contents converted from the TV programs via the internet and/or intranet, wherein the basic principles or techniques of the network communications are well-known by those skilled in the art, the following description will omit the description of the principles. Moreover, the diagrams included in the present invention are not completely drawn according to the real size and are only used for demonstration and explanation.

Figure 1:
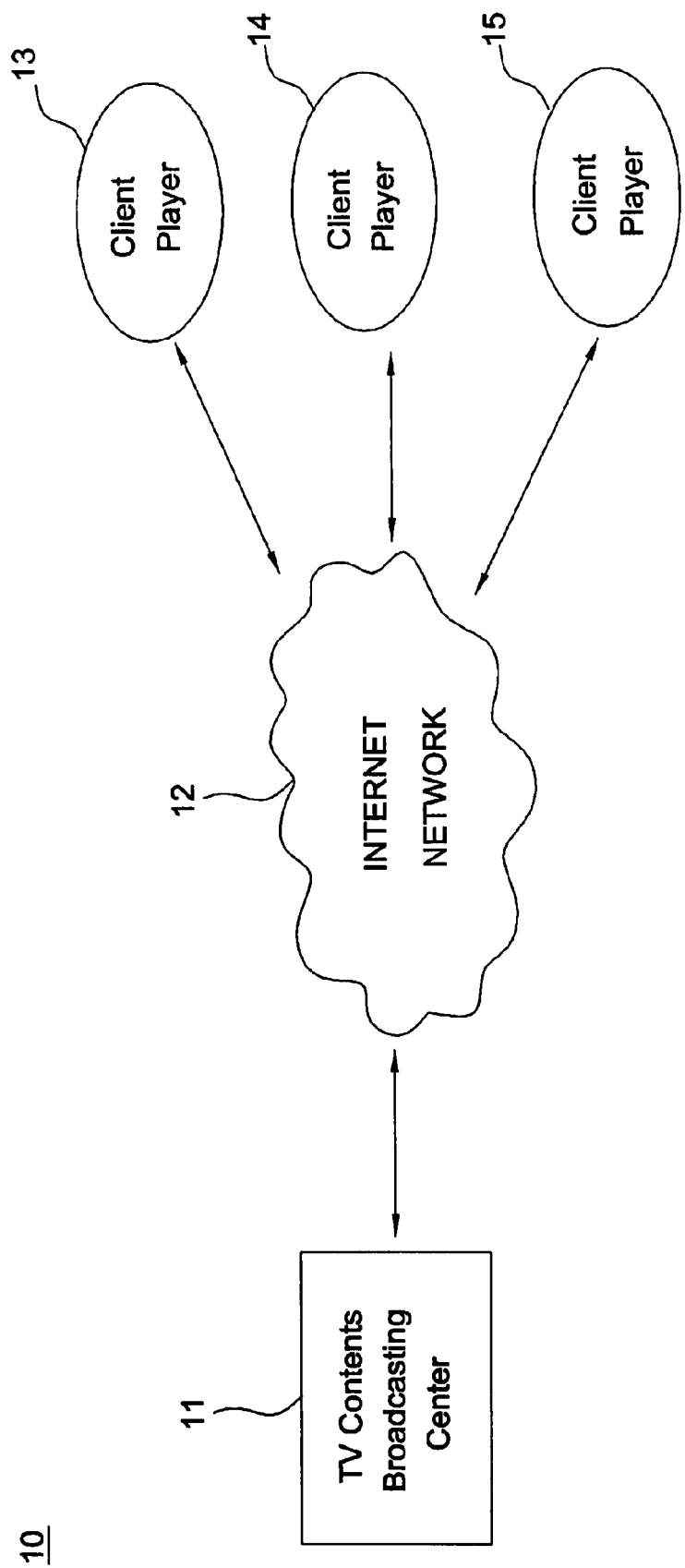
FIG. 1 is a prior art illustration of the conventional broadcasting system.
Figure 2A:
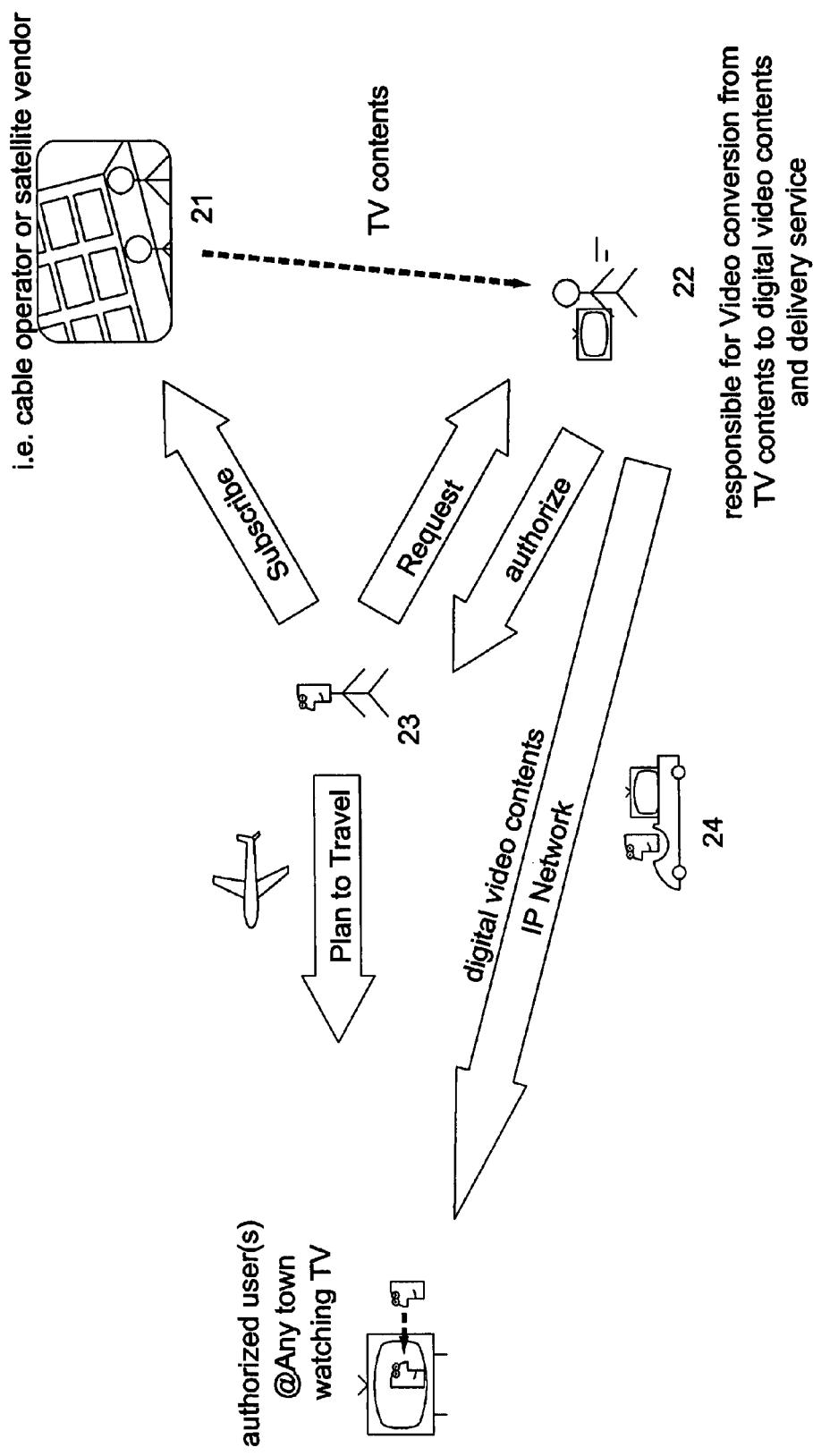
FIG. 2a is an illustrative diagram of a first preferred embodiment according to this invention.

Referring to FIG. 2a, it is an illustrative diagram of a first preferred embodiment according to this invention. The IP-based hometown TV program delivery system 20 comprises at least one TV program provider 21 and an agency 22. The TV program provider provides plural channels of TV programs originated in the hometown of the TV program provider 21 (e.g. somewhere around Asia). The agency 22 at a server-end provides plural digital video contents those are converted from the corresponding TV programs, and distributes digital video contents to an authorized user 23 at a client-end (e.g. somewhere in the United States) via a broadcasting network 24. Each authorized user 23 has a specific subscription to his/her hometown TV program provider so as to get a specific permission for watching his/her hometown TV programs. The agency makes use of the specific subscription of the corresponding authorized user 23 to subscribe the hometown TV program provider to receive hometown TV programs, and converts such TV programs to digital video contents, then delivers digital video contents to the corresponding authorized user 23 via the IP-based broadcasting network 24. If the authorized user 23 has no any subscription to any TV program provider, the agency won't subscribe to any TV program provider and won't deliver any digital video contents to the authorized user 23.

In the above-mentioned embodiment, the broadcasting network 24 can be a P2P based network, or a TCP/IP based network, or the like to deliver the digital video contents to the authorized user 23. Besides, the TV program provider 21 can be a cable operator, or a satellite TV program provider, or the like to provide TV programs. Moreover, the authorized user 23 at a client-end and the TV program provider 21 may be located in different towns, or in different countries, or in different geographical areas. The TV programs provided by TV program provider may be originated in such an area as Taiwan, Hong Kong, Macao, China, Korea, Japan, India, or Vietnam; while the authorized user 23 at a client-end can be located in such a country as the United States or Canada. Alternatively, the authorized user 23 at a client-end can be also located in such an area as Taiwan, Hong Kong, Macao, China, Korea, Japan, India, or Vietnam; while the TV programs can be originated from such a country as the United States or Canada.

The client end may comprises a terminal for displaying digital video contents, such as a laptop computer, a desktop computer, a television, a PDA, a wireless phone, or the like.

In the above-mentioned embodiment, the IP-based hometown TV program delivery system 20 also works when there are plural TV program providers 21, or there are plural agencies 22.

Figure 2B:
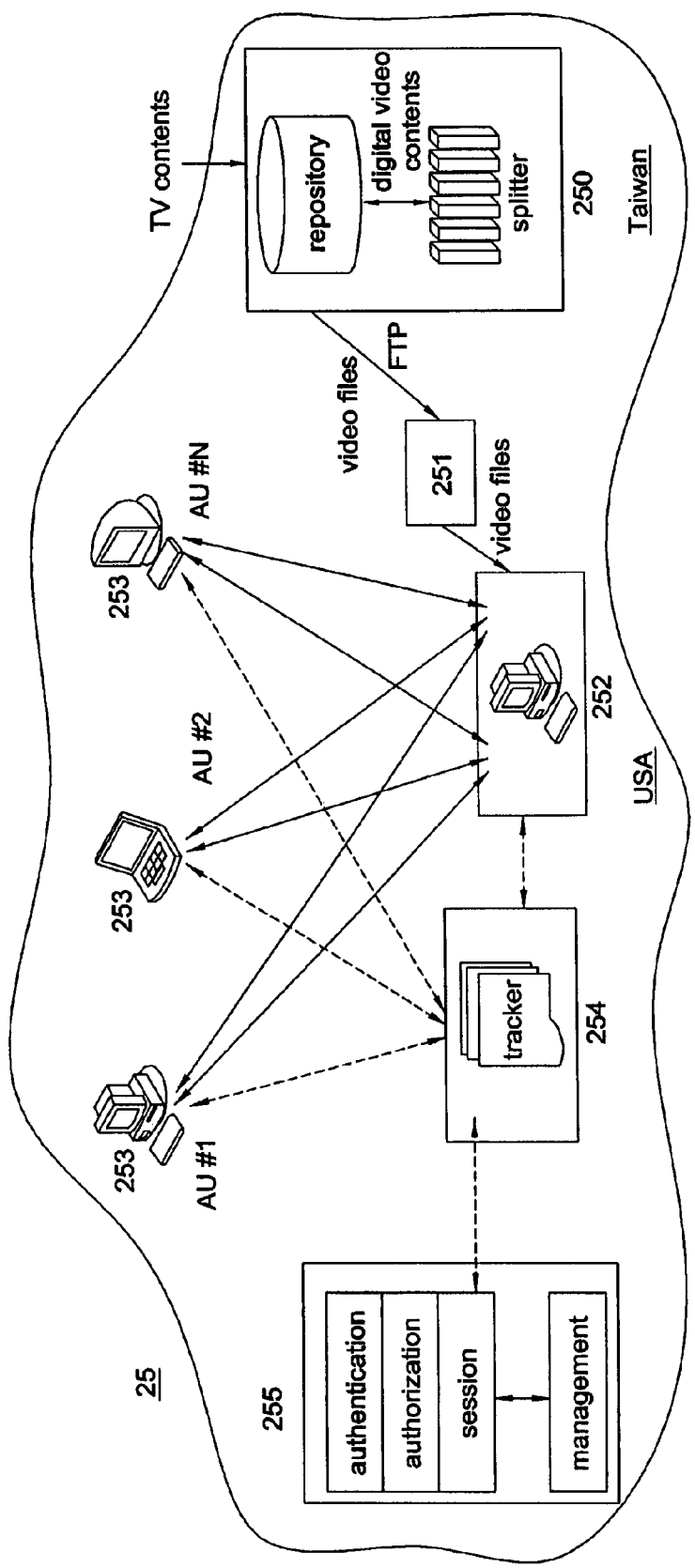

Referring to FIG. 2b, it is an illustrative diagram of a P2P based network for a broadcasting network in the first preferred embodiment shown in FIG. 2a. The P2P based network 25 is a physical implementation of the broadcasting network 24 shown in FIG. 2a. The P2P based network 25 comprises a head-end server 250, a relay server 251, a seed host 252, a number of peer hosts 253, a network management server 254, and a system management server 255. The head-end server 250 may be allocated in Taiwan, for example, for receiving plural digital video contents that are converted from the corresponding TV programs of the at least a TV program provider 21. Particularly, the head-end server 250 comprises a splitter to split each of the digital video contents into plural video files, each of which is the basic unit transmitted in the P2P based network 25 and is formed of a number of groups of pictures (GOPs). The video head-end server 250 further comprises a content repository for storing the sliced video files corresponding to each of the digital video contents. The relay server 251 allocated in the US, for example, is to receive the video files corresponding to each of the digital video contents from a video head-end server 250 allocated in Taiwan via a file transfer protocol (FTP) in the Internet. The seed host 252 is to receive the video files from the relay server 251, and the peer hosts 253 are to receive the video files respectively from the seed 252 and/or other peer 253 based on P2P file sharing operation. The network management server 254 is to manage all the data and signal communication between the seed host 252 and peer hosts 253 for collecting all the network information. Besides, the network management server 254 comprises a number of trackers for each of which provides the seed/peer list indicating where to access each of the video files in the P2P network. The system management server 255 is to provide authentication and authorization to authorized users 23 for validating the user's session-channel info indicated in an access request when they are desirous of watching which hometown TV channel and when to broadcast the programs in the channel.

Figure 2C:
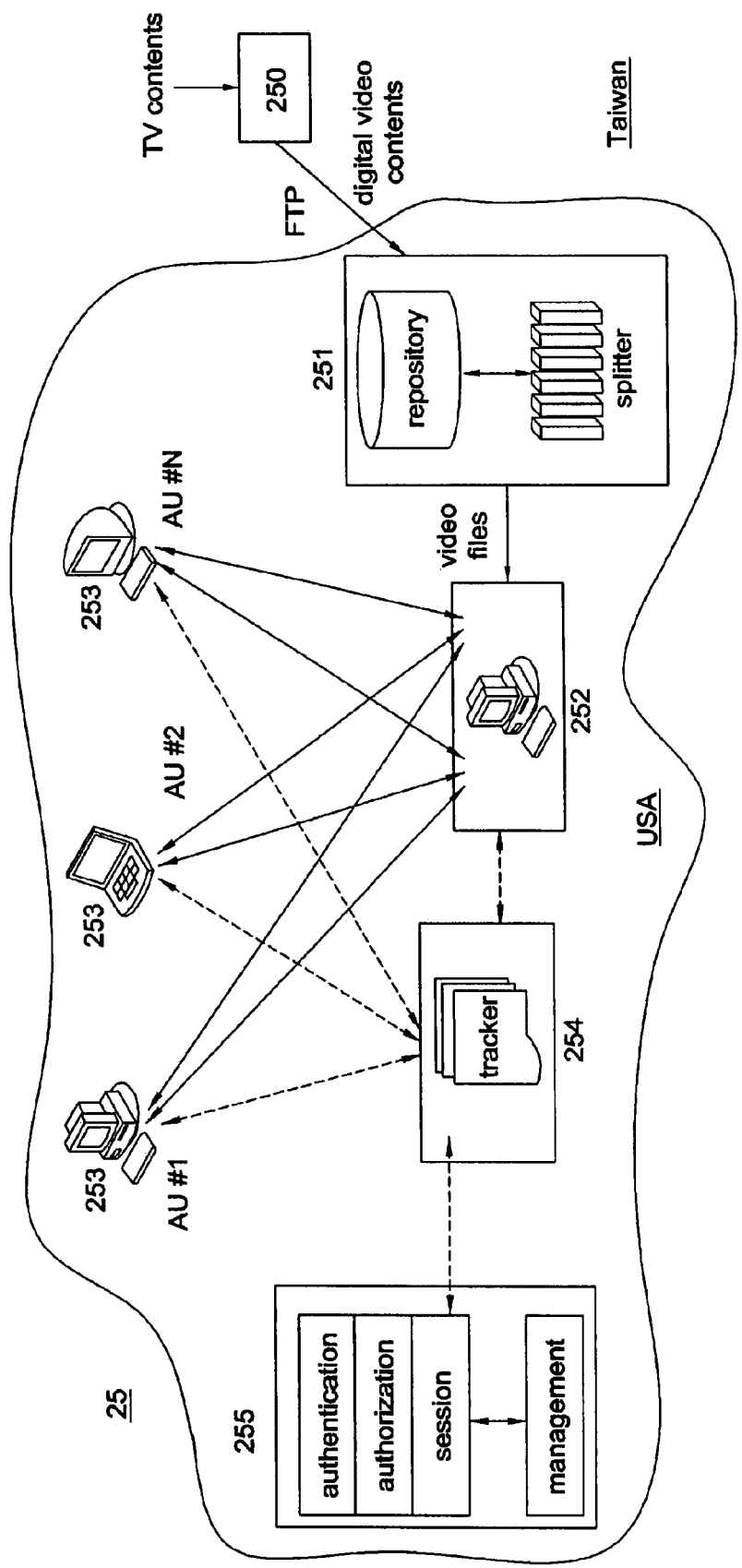

Referring to FIG. 2c, it is an illustrative diagram of another P2P based network for a broadcasting network in the first preferred embodiment shown in FIG. 2a. The P2P based network 25 shown in FIG. 2c is another physical implementation of the broadcasting network 24 shown in FIG. 2a. The P2P based network 25 comprises a relay server 251, a seed host 252, a number of peer hosts 253, a network management server 254, and a system management server 255. The relay server 251 allocated in the US, for example, is to receive plural digital video contents from a video head-end server 250 allocated in Taiwan, for example, via a file transfer protocol (FTP) in the internet. The video head-end server 250 can convert the hometown TV programs of TV program provider 21 into the digital video contents so as to deliver the digital video contents to the relay server 251 via the FTP. The relay server 251 further comprises a content repository for receiving the digital video contents from the video head-end server 250 and a splitter for splitting each of the digital video contents into plural video files, wherein each of the video files includes a number of groups of pictures (GOPs). The seed host 252 is to receive the video files from the relay server 251, and the peer hosts 253 are to receive the video files respectively from the seed 252 and/or other peer 253 based on P2P file sharing operation. The network management server 254 is to manage all the data and signal communication between the seed host 252 and peer hosts 253 for collecting all the network information. Besides, the network management server 254 comprises a number of trackers for each of which provides the seed/peer list indicating where to access each of the video files in the P2P network. The system management server 255 is to provide authentication and authorization to authorized users 23 for validating the user's session-channel info indicated in an access request when they desire to watch which hometown TV channel and when to broadcast the programs in the channel.

Figure 2D:
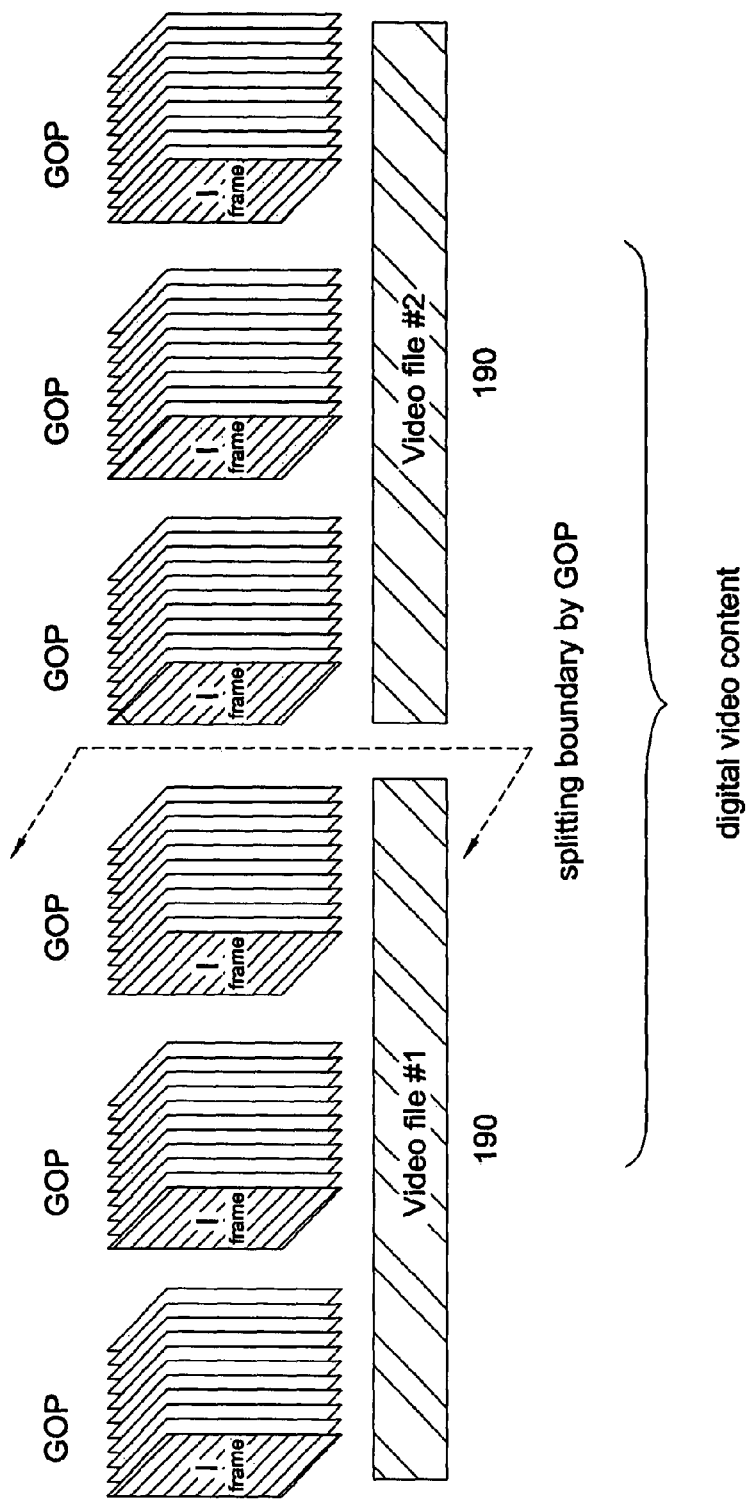
FIG. 2d is an illustrative diagram of a video file structure for a splitter slicing each video file into GOPs in the P2P based network according to this invention.

Referring to FIG. 2d, it is an illustrative diagram of a video file structure for a splitter slicing each video file into GOPs in the P2P based network according to this invention. GOP is the minimum unit for each video file, wherein the size or length of each GOP can be variable or fixed. The splitter is to split each digital video content into plural video files based on GOP' boundary such that it is impossible to cause the image distortion when each of the video files is received at the client side for playback.

Figure 2E:
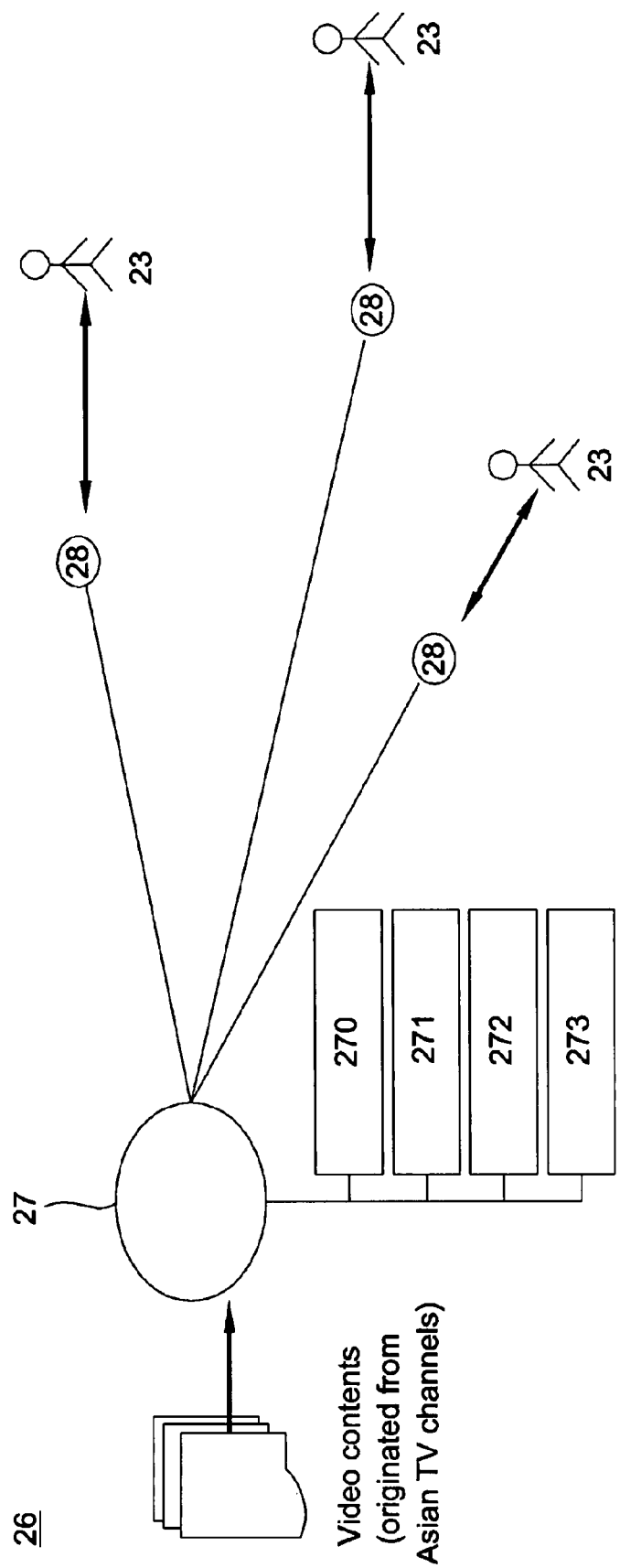

Referring to FIG. 2e, it is an illustrative diagram of another broadcasting network in the first preferred embodiment shown in FIG. 2a. The broadcasting network 26 comprises a broadcasting apparatus 27 and plural players 28. The broadcasting apparatus 27 is to store and broadcast plural digital video contents that are converted from corresponding hometown TV programs; and each of plural players 28 accessed by the authorized user 23 is to receive plural digital video contents from the broadcasting apparatus 27 based on video streaming technique via the internet. The broadcasting apparatus 27 comprises a timezone shifting means 270, a timezone non-shifting means 271, a language selecting means 272, and a user profile means 273. The timezone-shifting means 270 is provided for shifting the timing lag between the overseas timezone in Taiwan when the hometown TV content is broadcast and the local timezone in California when the authorized user intends to watch, such that the broadcasting apparatus 27 may deliver the corresponding digital video contents to the player 28 in a preferred timing for the authorized user 23. The timezone non-shifting means 271 is provided for delivering the digital video contents to the player 28 in the quasi-real-time timing when the corresponding TV programs are broadcasted at the overseas timing. The language-selecting means 272 is provided for, in response to a request for the user's preferred language selection from the player 28, the digital video contents originated in the hometown language to the player; and the user-profile means 273 is provided for, whenever each of said players accesses the broadcasting network, collecting and analyzing the authorized user 23 relating data from the player 28 to develop a user profile for each of the authorized users 23.

In the above-mentioned embodiment, wherein the broadcasting apparatus 27 further comprises one or more servers (unlabeled) for performing at least one operation of video storing, video streaming, web accessing, proxy managing, and cache buffering disposed within the broadcasting network 26. Besides, the broadcasting apparatus 27 further comprises a user-community means (unlabeled) for grouping a couple of the authorized users 23 into one or more communities based on each of the authorized users and provides authorized users with personalized services based on each of the communities. Moreover, the broadcasting apparatus 27 further comprises plural virtual servers (unlabeled) invoked by the broadcasting apparatus 27 for improving quality of service and transmission bandwidth to deliver the digital video contents to each of the players 28 via the Internet. Furthermore, the timezone non-shifting means 271 precisely controls the delivery of the digital video contents from the broadcasting apparatus 27 to each of the players 28 in an allowable timing delay, for example, within a couple of seconds.

Figure 3A:
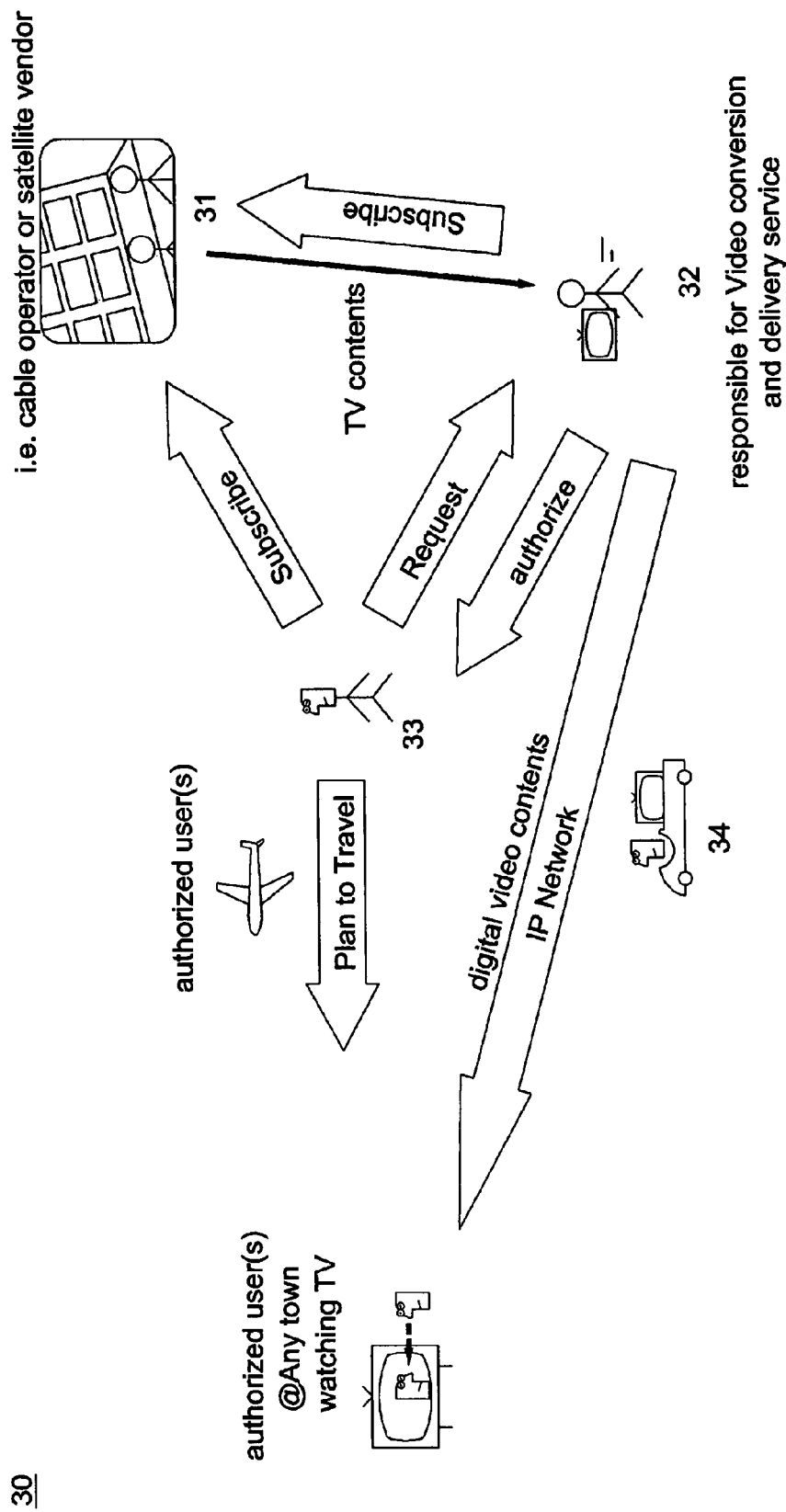
FIG. 3a is an illustrative diagram of a second preferred embodiment according to this invention.

Referring to FIG. 3a, it is an illustrative diagram of a second preferred embodiment according to this invention. The IP-based hometown TV program delivery system 30 comprises at least one TV program provider 31 and an agency 32. TV program provider 31 provides plural channels of hometown TV programs. The agency 32 at a server-end provides plural digital video contents converted from the corresponding TV programs and distributes plural digital video contents to an authorized user 33 at a client-end (e.g. somewhere in the United States) via a broadcasting network 34. Compared to FIG. 2a, the agency 32 shown in FIG. 3a has direct subscription to the hometown TV program provider so as to get permission for receiving TV programs and convert TV programs to corresponding digital video contents. The user 33 doesn't need to have subscription to TV program provider, once the user 33 is authorized by the agency 32, the user 33 can receive digital video contents from the agency 32 via the broadcasting network 34. Preferably, the broadcasting network 34 is a P2P based network to deliver the digital video contents that are converted from the corresponding TV programs to the authorized users 33 for reducing network bandwidth consumption. Alternatively, it also works when the broadcasting network 34 is a TCP/IP based network. Besides, the TV program provider 31 can be a cable operator, or a satellite TV program provider, or the like to provide TV programs. Moreover, the authorized user 33 at a client-end and the TV program provider 31 can be located in different towns or different countries or different geographical areas. The TV programs can be originated in such an area as Taiwan, Hong Kong, Macao, China, Korea, Japan, India, or Vietnam, and the authorized user 33 at a client-end can be located in such a country as the United States or Canada. Alternatively, the authorized user 33 at a client-end can be located in such an area as Taiwan, Hong Kong, Macao, China, Korea, Japan, India, or Vietnam, and the TV programs can be originated from such a country as the United States or Canada. The client end can be a terminal that is selected from one of a laptop computer, a desktop computer, a television, a PDA, and a wireless phone.

Figure 3B:
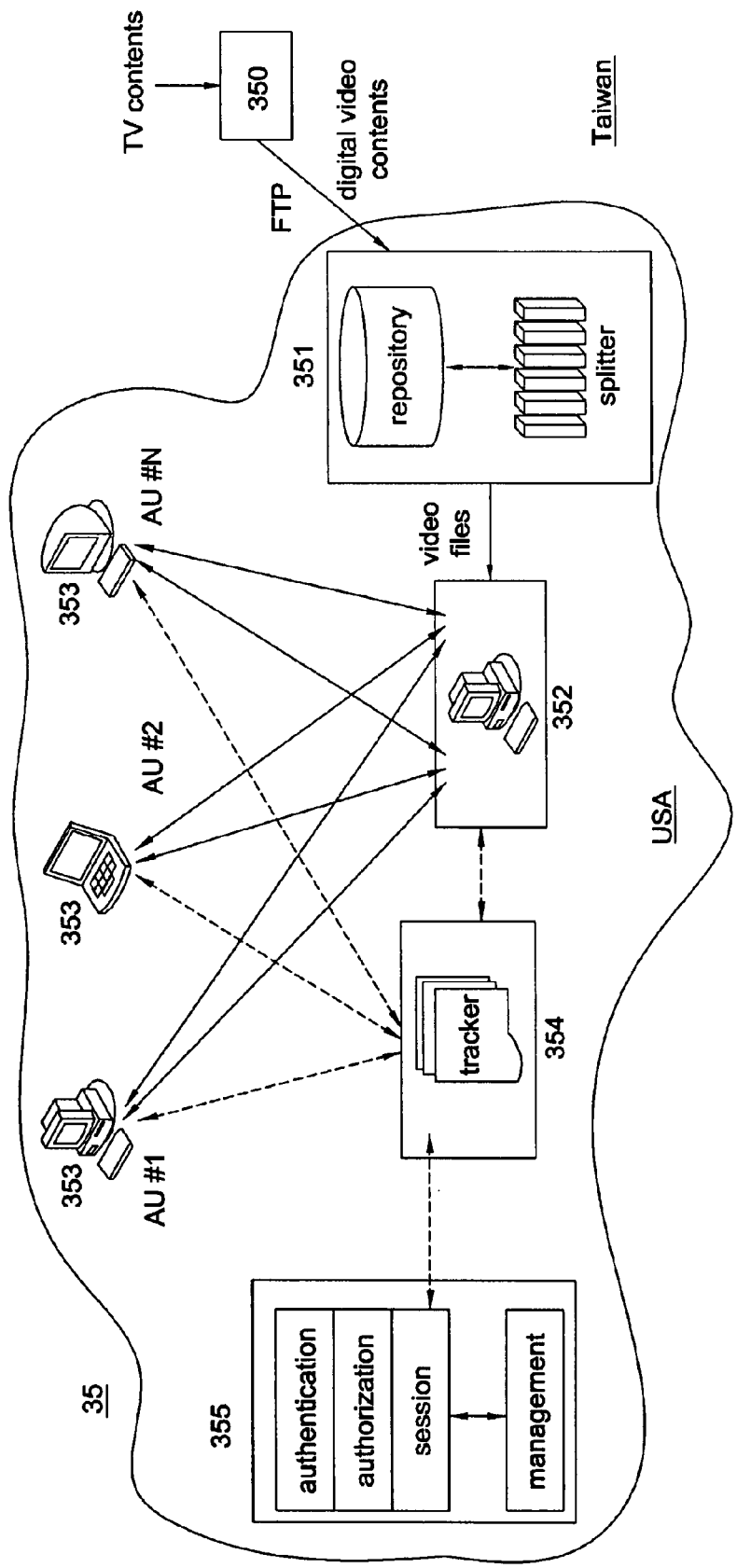

Referring to FIG. 3b, it is an illustrative diagram of a P2P based network for a broadcasting network in the second preferred embodiment shown in FIG. 3a. The P2P based network 35 shown in FIG. 3b is a physical implementation of the broadcasting network 34 shown in FIG. 3a. The P2P based network 35 comprises a head-end server 350, a relay server 351, a seed host 352, a number of peer hosts 353, a network management server 354, and a system management server 355. The head-end server 350 may be allocated in Taiwan, for example, for receiving plural digital video contents that are converted from the corresponding TV programs of the at least a TV program provider 31. Particularly, the head-end server 350 comprises a splitter to split each of the digital video contents into plural video files, each of which is the basic unit transmitted in the P2P based network 35 and is formed of a number of groups of pictures (GOPs). The video head-end server 350 further comprises a content repository for storing the sliced video files corresponding to each of the digital video contents. The relay server 351 allocated in the US, for example, is to receive the video files corresponding to each of the digital video contents from a video head-end server 350 allocated in Taiwan via a file transfer protocol (FTP) in the Internet. The seed host 352 is to receive the video files from the relay server 351, and the peer hosts 353 are to receive the video files respectively from the seed 352 and/or other peer 353 based on P2P file sharing operation. The network management server 354 is to manage all the data and signal communication between the seed host 352 and peer hosts 353 for collecting all the network information. Besides, the network management server 354 comprises a number of trackers for each of which provides the seed/peer list indicating where to access each of the video files in the P2P network. The system management server 355 is to provide authentication and authorization to authorized users 33 for validating the user's session-channel info indicated in an access request when they are desirous of watching which hometown TV channel and when to broadcast the programs in the channel.

Figure 3C:
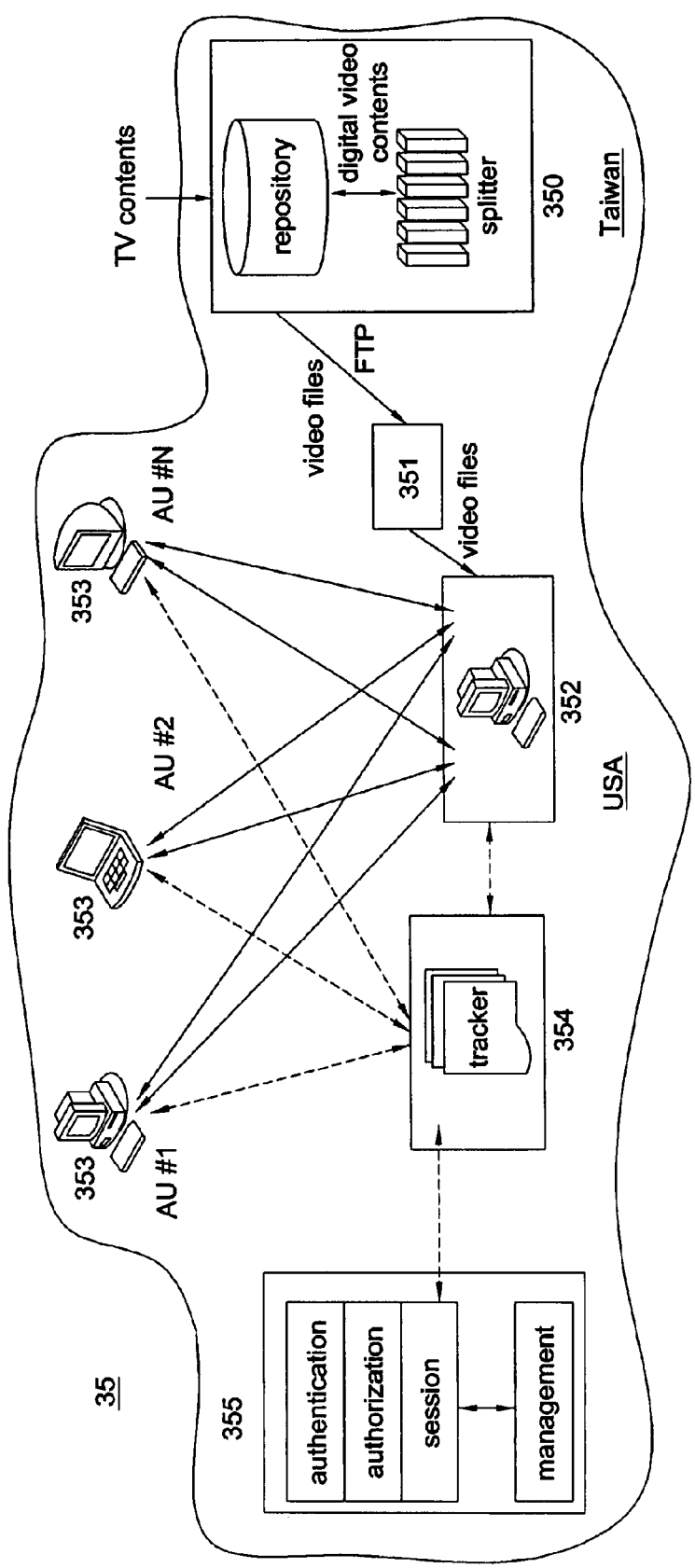

Referring to FIG. 3c, it is an illustrative diagram of another P2P based network for a broadcasting network in the second preferred embodiment shown in FIG. 3a. The P2P based network 35 comprises a relay server 351, a seed host 352, a number of peer hosts 353, a network management server 354, and a system management server 355. The relay server 351 allocated in the US, for example, is to receive plural digital video contents from a video head-end server 350 allocated in Taiwan, for example, via a file transfer protocol (FTP) in the internet. The video head-end server 350 can convert the hometown TV programs of TV program provider 31 into the digital video contents so as to deliver the digital video contents to the relay server 351 via the FTP. The relay server 351 further comprises a content repository for receiving the digital video contents from the video head-end server 350 and a splitter for splitting each of the digital video contents into plural video files, wherein each of the video files includes a number of groups of pictures (GOPs). The seed host 352 is to receive the video files from the relay server 351, and the peer hosts 353 are to receive the video files respectively from the seed 352 and/or other peer 353 based on P2P file sharing operation. The network management server 354 is to manage all the data and signal communication between the seed host 352 and peer hosts 353 for collecting all the network information. Besides, the network management server 354 comprises a number of trackers for each of which provides the seed/peer list indicating where to access each of the video files in the P2P network. The system management server 355 is to provide authentication and authorization to authorized users 33 for validating the user's session-channel info indicated in an access request when they desire to watch which hometown TV channel and when to broadcast the programs in the channel. Besides, the structure and features of the GOP are the same as those in the above-mentioned embodiment shown in FIG. 2d.

The above-mentioned preferred embodiments are not meant to limit the scope of the present invention. The description of the present invention should be understood by those skilled in the art. In view of the above teaching, other embodiments may be envisioned by those skilled in the art without departing from the spirit of the invention. Moreover, any changes or modifications or the equivalent thereof that can be made without departing from substantial spirit of the present invention should be protected by the following claims.

I claim:

1. An IP-based hometown TV program delivery system comprising at least one TV program provider for providing a plurality of channels of TV programs; and at least one agency at a server-end for providing a plurality of digital video contents converted from said corresponding TV programs; characterized in that said agency at a server-end distributes said plurality of digital video contents to authorized users at a client-end via a broadcasting network, wherein authorized users get permission for watching said TV programs and authorize said agency for receiving said corresponding TV programs via said broadcasting network after said authorized users have subscription of those said TV programs directly from said at least one TV program provider;

wherein said broadcasting network is a P2P based network; and wherein said P2P based network comprises:

at least one video head-end server for receiving said plurality of digital video contents converted from said corresponding TV programs, said video head-end server comprising a splitter to split each of said digital video contents into a plurality of video files, each of which is formed of a number of groups of pictures (GOPs), based on GOP's boundary, and said video head-end server further comprising at least one content repository for storing said video files corresponding to each of said digital video contents;

at least one relay server for receiving said video files from said video head-end server and broadcasting said video files from said one relay server;

at least one seed host for receiving said video files from said relay server and broadcasting said video files from said seed host;

a plurality of peer hosts accessed by said authorized users for receiving said video files from said seed host and/or other neighboring peer hosts and broadcasting said video files;

at least one network management server for managing data and signal communications among said seed host and said peer hosts, said network management server comprising at least one tracker for generating a seed/peer list based on a request for said video files from each of said authorized users; and at least one system management server for validating authentication and authorization of each of said authorized users while receiving an access request from each of said authorized user;

wherein each peer comprises a player to process said video files for playback when said video files are received.

2. The IP-based hometown TV program delivery system according to claim 1, wherein said broadcasting network is a TCP/IP based network.

3. The IP-based hometown TV program delivery system according to claim 1, wherein said TV program provider is a cable operator.

4. The IP-based hometown TV program delivery system according to claim 1, wherein said TV program provider is a satellite TV program provider.

5. The IP-based hometown TV program delivery system according to claim 1, wherein said authorized user at a client-end and said TV program provider are located in different towns.

6. The IP-based hometown TV program delivery system according to claim 1, wherein said authorized user at a client-end and said TV program provider are located in different countries.

7. The IP-based hometown TV program delivery system according to claim 1, wherein said authorized user at a client-end and said TV program provider are located in different geographical areas.

8. The IP-based hometown TV program delivery system according to claim 1, wherein said TV programs are originated from the area selected from the group consisting of Taiwan, Hong Kong, Macao, China, Korea, Japan, India, and Vietnam; and said authorized user at a client-end is in the country selected from the group consisting of the United States and Canada.

9. The IP-based hometown TV program delivery system according to claim 1, wherein said authorized user at a client-end is in the area selected from the group consisting of Taiwan, Hong Kong, Macao, China, Korea, Japan, India, and Vietnam; and said TV programs are originated from the country selected from the United States and Canada.

10. The IP-based hometown TV program delivery system according to claim 1, wherein said client end comprises a terminal selected from the group consisting of a laptop computer, a desktop computer, a television, a PDA, and a wireless phone.

11. The IP-based hometown TV program delivery system according to claim 1, wherein said broadcasting network comprises a broadcasting apparatus for storing and broadcasting said plurality of digital video contents; and a plurality of players accessed by said authorized users for receiving said plurality of digital video contents from the broadcasting apparatus based on video streaming via the internet; wherein said broadcasting apparatus comprises:

a timezone shifting means for shifting the timing lag between the overseas timezone as TV content originating and the local timezone as authorized user watching so as to deliver said corresponding digital video contents to said players in a preferred timing for said authorized user;

a timezone non-shifting means for delivering said digital video contents to said player in the quasi-realtime timing as said corresponding TV programs broadcasted at the overseas timing;

a language selecting means for, in response to a request for authorized user's preferred language selection from said player, providing said digital video content originated in the specified language to the player; and a user profile means for, whenever each of said players accesses said broadcasting network, collecting and analyzing said authorized user data from said player to develop a user profile for each of said authorized users.

12. The IP-based hometown TV program delivery system according to claim 11, wherein said broadcasting apparatus further comprises one or more servers for performing at least one operation of video storing, video streaming, web accessing, proxy managing, and cache buffering.

13. The IP-based hometown TV program delivery system according to claim 11, further comprising a user community means for grouping said authorized users into one or more communities based on each of said authorized users and providing authorized users with personalized services based on each of said communities.

14. The IP-based hometown TV program delivery system according to claim 11, further comprising a plurality of virtual servers invoked by said broadcasting apparatus for improving quality of service to deliver said digital video contents to said players via the internet.

15. The IP-based hometown TV program delivery system according to claim 11, wherein timezone non-shifting means controls the delivery of said digital video contents from said broadcasting apparatus to each of said players in an allowable timing delay.

* * * * *